May 29, 1945.                R. M. SCHMITZ                2,377,108
                            DEBURRING MACHINE
                         Filed Nov. 28, 1942          3 Sheets-Sheet 1
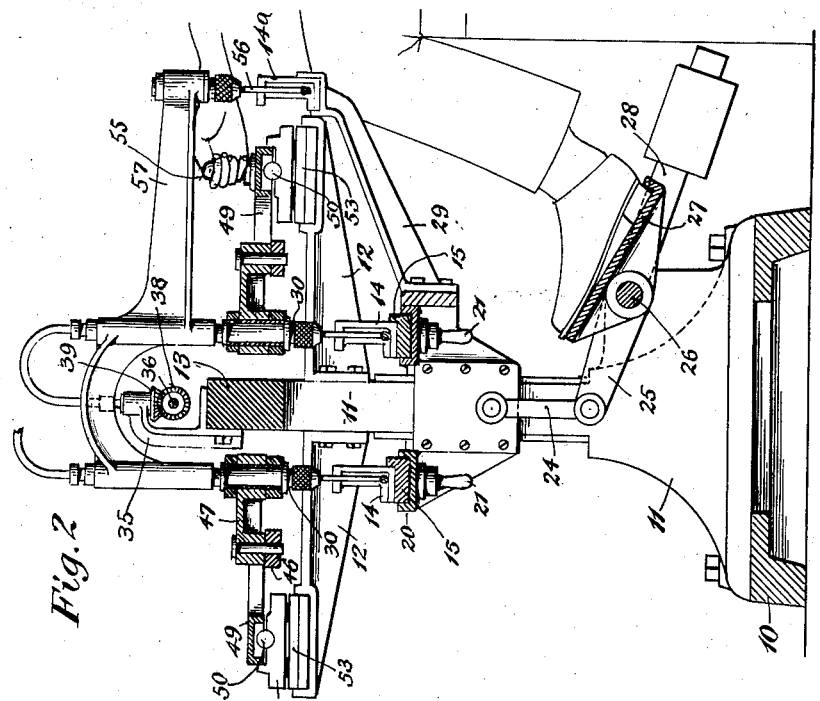
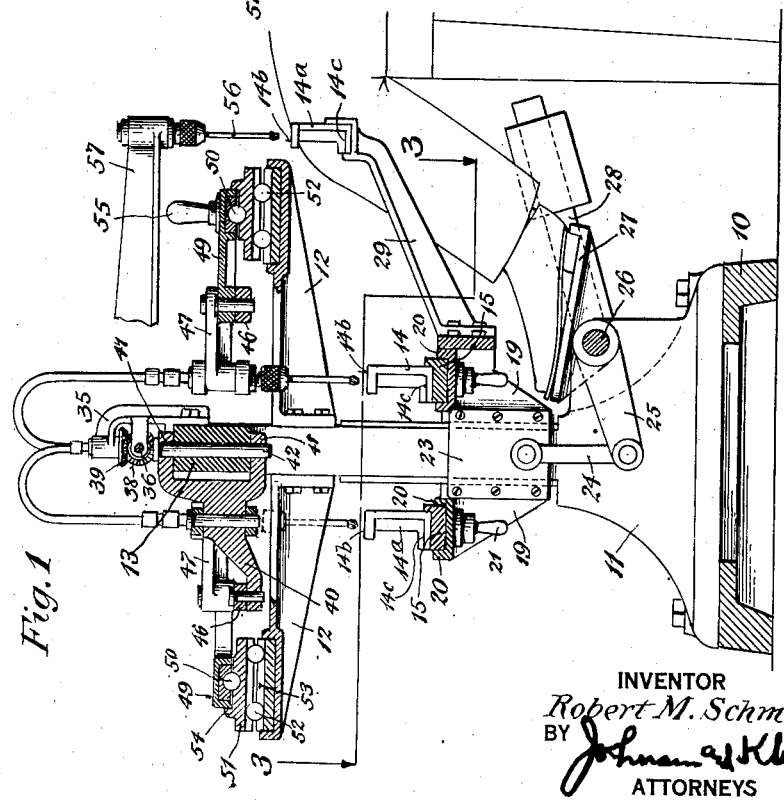
INVENTOR
Robert M. Schmitz,
BY
ATTORNEYS

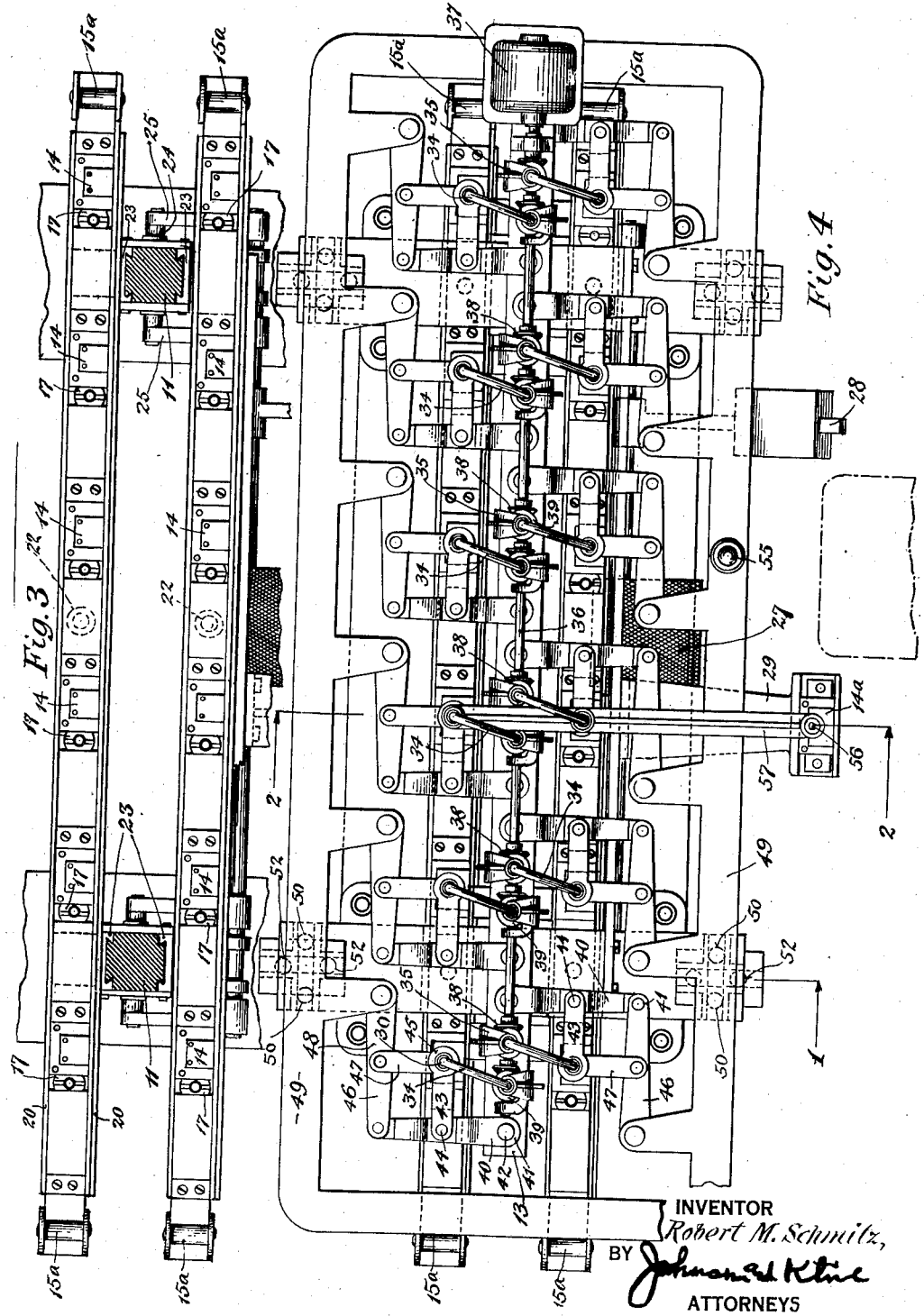

May 29, 1945.　　　R. M. SCHMITZ　　　2,377,108
DEBURRING MACHINE
Filed Nov. 28, 1942　　　3 Sheets-Sheet 3
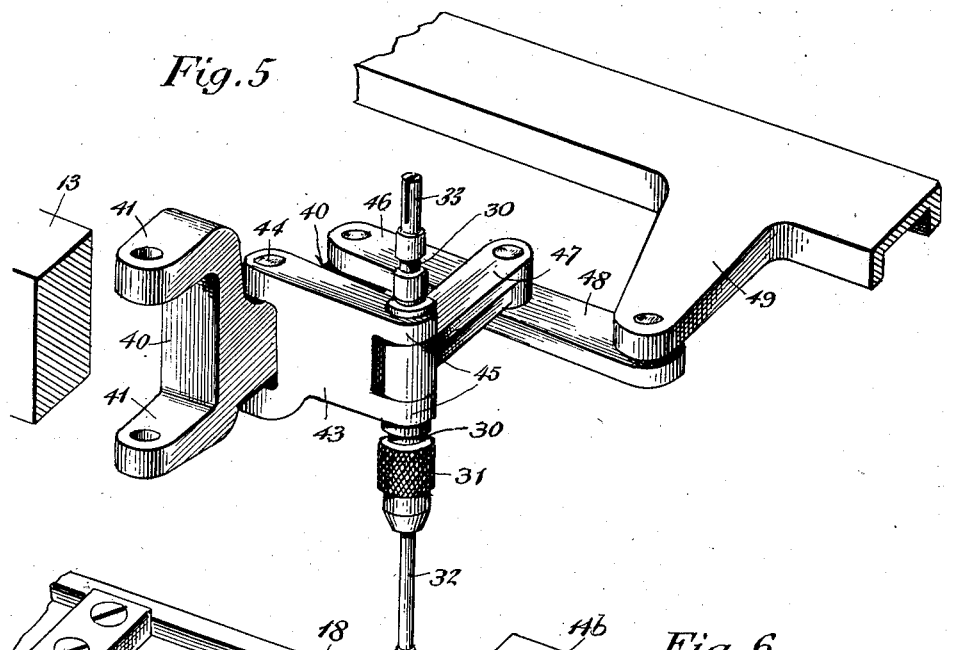
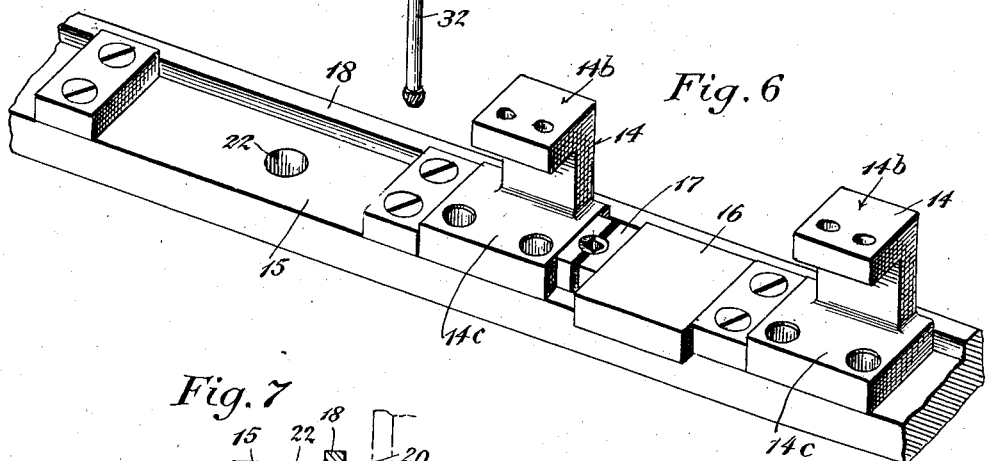
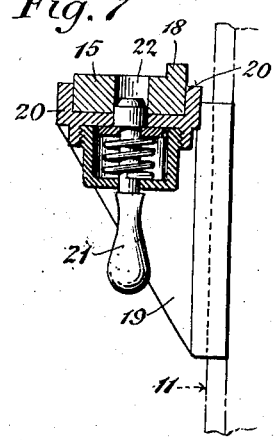
INVENTOR
Robert M. Schmitz,
BY
ATTORNEYS Patented May 29, 1945

2,377,108

UNITED STATES PATENT OFFICE 2,377,108

DEBURRING MACHINE

Robert M. Schmitz, Milford, Conn.

Application November 28, 1942, Serial No. 467,163

11 Claims. (Cl. 90—13.2)

This invention relates to machines for removing burrs from drilled or tapped holes or from the edges of milled pieces.

In the manufacture of machine elements and parts, especially in high speed production, burrs are formed on the underside of the pieces where the drill or tap breaks through, and in many cases it is necessary to remove these burrs before the parts may be finished or assembled with other parts. At present, this is done by hand with hand tools such as files or the like, or by applying a power-driven deburring tool to the underside of the work—one piece of work at a time. This not only slows down production, but also adds considerably to the cost of the part.

Besides, this manual operation is dangerous, especially when performed by unskilled persons, for unless care is exercised the tool may slip when being applied to a heavy or thick burr and cause injury to the operator's hand holding the piece or the burr might fly off and cause injury.

An object of this invention is to facilitate this deburring operation to the end that more pieces can be finished per man-hour, and, therefore, at less cost, and without danger of the operator being injured either by the deburring tool or slivers of metal thrown off while doing the work.

In carrying out this object, the present invention provides means for performing on a plurality of pieces at the same time and doing so remote from the operator. This is accomplished in the form of the invention herein illustrated as exemplary thereof, by supporting a plurality of workpieces in operative relation to a plurality of power-driven tool spindles and producing relative movement between the tool spindles collectively and the workpieces collectively to position the spindles over desired places on the work, and, further, providing for relative movement between the tool spindles and workpieces to perform the work. Thus, by placing one spindle and one workpiece in the desired position, all the others will be so positioned, and when brought together the deburring operation is performed on all the workpieces simultaneously.

According to this invention in its broader aspects, it is optional whether the workpieces be stationary while the spindles are moved, or vice versa, for positioning them relatively; or, whether the spindles are moved toward the work, or the work toward the spindles in performing the operation.

However, it is considered especially advantageous to move only the spindles for position selecting, and the workpieces only for work performing, for when the mechanism is so arranged the position selecting, which is relatively easy work, may be performed by hand power, while the work of moving the workpieces against the spindles is relatively greater and may be conveniently performed by foot power. Besides, with the machine arranged for the spindles to move only horizontally and the work to move only vertically, substantial simplification of the mechanism of the machine is effected.

To interconnect the spindles (or the workpieces—if the nonpreferred arrangement is employed), I preferably provide a plurality of pantographic lever systems, one for each spindle, and interconnect these through a frame or universal bar which is mounted for universal movement in a horizontal plane. Hence, by moving the frame by means of a suitable handle, all the pantographic lever systems move substantially together, and by following visually the movement of one spindle or tool thereon relative to a workpiece, all the spindles may be caused to move likewise.

If desired, a guide or dummy spindle may be connected to the leverage system and a finished or sample workpiece may be mounted in an extension of the worktable in good view of the operator who may position all the spindles by following the guide on the sample.

To further facilitate the operation and use of the machine, the workpieces are preferably assembled in predetermined position in a jig outside the machine, and this is placed in and removed from the machine as a unit, the jig preferably being held in predetermined position by suitable locating means.

In the machine illustrated herein, the worktable has separate front and rear portions and hence two jigs loaded with workpieces are used.

In order to compensate for inequalities in the work, or their respective location on the jig, thereby permitting the pieces to be jigged without the exercise of too much care, each spindle has its own pantographic linkage system and sufficient lost motion or looseness between the parts is permitted so that the deburring tool on the spindle may center itself in the hole to be deburred.

The machine of the present invention may be used for other light finishing operations, such as milling, routing, countersinking, buffing and polishing.

Other features and advantages will hereinafter appear.

In the accompanying drawings which illustrate the embodiment of this invention at present preferred.

Figure 1 is a transverse sectional view along line 1—1 of Fig. 4 showing the parts in the positions they assume when the worktable is depressed and ready to be raised to perform work.

Fig. 2 is a similar view taken along line 2—2 of Fig. 4, but showing the worktable elevated and the deburring operation being performed, and also showing a guide member and dummy or sample workpiece for use in guiding and operating the machine.

Fig. 3 is a horizontal section taken on the line 3—3 of Fig. 1.

Fig. 4 is a top plan view of the machine.

Fig. 5 is a perspective view of the linkage system by means of which the spindle is controlled in its movements.

Fig. 6 is a plan view of one of the worktables with the jig in place thereon.

Fig. 7 is a sectional view of the means for locating and holding the jig on the worktable.

The machine of the present invention comprises a fame having a base 10, vertical supporting members 11, horizontal supporting arms 12, and an upper longitudinal rib or web 13 connecting the posts 11 together.

According to the present invention, the workpieces or parts 14, which are to have the burrs removed from drilled and tapped holes therein, are assembled on a jig 15 being located thereon by means of blocks 16 and quoins 17 by means of which the pieces 14 are tightened against the blocks 16. The jig 15 has a longitudinal flange 18 against which the pieces 14 may be placed to locate them in desired position.

According to the present invention, the jig 15 has the workpieces 14 assembled thereon outside of the machine. This operation may be performed by boys or unskilled workers, and a supply of the assembled jigs may be at hand for quick insertion into the machine upon removal therefrom of the jig containing the finished pieces.

To receive the jigs, the machine is provided with one or more worktables 19 having front and rear flanges 20 between which the jig may slide and against which the jig fits, the jig being provided at one or both ends with a suitable handle 15a. When the jig is in proper position on the worktable 19, a locating pin 21 (see Fig. 7) thereon will enter a hole 22 in the jig and will hold the jig against movement on the table. The worktables 19 extend longitudinally of the machine and are mounted on slides or carriages 23 having a dovetailed sliding connection, as shown in Fig. 3, with the vertical supporting members 11.

In the preferred form of the present invention, the workpieces are moved toward the tools to perform the work. For this purpose, the slides 23 are connected by links 24 to arms 25 on a shaft 26 which is also equipped with a treadle 27 by means of which the worktables may be moved up and down relative to the frame of the machine and to the tool spindles thereon. A counterweight lever 28 counterbalances the weight of the work-supporting structure and the work itself, and makes it comparatively easy for the operator to move the work up and down by use of his foot, as indicated in Figs. 1 and 2.

The work-supporting structure may have attached to it an upwardly and forwardly extending arm 29 on which may be supported a sample or dummy workpiece 14a, this being comparatively close to the operator and within his convenient range of vision may, in cooperation with a guide member described below, aid the operator in performing the deburring operation on the several workpieces.

According to the present invention and in order to increase the capacity of the machine and yet permit the use of comparatively simple framework, the longitudinal web 13 extends through the middle of the machine and duplicate mechanisms are carried on each side of it. Thus, in this particular machine there are two worktables and two jig holders united through the slides 23. Likewise, there are two sets of spindles, one in front of the web 13 and the other in back of it.

As above explained, in the preferred form of the present invention, the location of the tools, in this instance burrs or countersink-like members, relative to the work is controlled by movements of the tools collectively in a horizontal plane by means of a manual control which may be manipulated so as to move the tools into proper position over the holes to be deburred. Pantographic linkage systems are employed for this purpose, each system supporting a spindle 30 which, as more clearly shown in Fig. 5, may have at its lower end a chuck 31 to support a tool 32 of the desired kind. The upper end of each spindle has a fitting or connection 33 to a flexible shaft 34. All of the flexible shafts are bent toward the longitudinal web 13 where they are mounted in bearing brackets 35 located over a universal drive shaft 36 extending parallel with and above the horizontal rib 13. As shown in Fig. 4, the drive shaft is provided with a motor 37 and a series of beveled gears 38, each of which meshes with a beveled gear 39 connected to the end of a flexible shaft 34. It will thus be seen that through this universal connection all of the spindles are driven simultaneously deriving their power from a single motor 37.

The spindles 30 and their drive shafts are so supported as to always be spaced apart the same distance as the spacing of the workpieces 14 on the jig 15.

To move each spindle horizontally relative to the work, a pantographic linkage system shown in Fig. 5 is employed. This system includes a forked lever 40, the arms 41 of which straddle the longitudinal rib 13 and are suitably fulcrumed thereon as by pins 42. Between its ends, the lever 40 is straddled by a forked arm or link 43 pivoted thereto by pins 44. The other end of the arm 43 has ears 45 constituting bearings for the spindle 30. The arm 43 and lever 40 support the weight of the spindle, and, to do so and resist upward thrust on the spindle, wide spread bearing surfaces between the arm, the lever, and the longitudinal rib are provided by the forked arrangements shown and described.

The end of the lever 40 is connected to a link 46 and this link 46 is connected by another link 47 to the end of the arm 43, thus providing a parallelogram which may be changed in outline by movement of the link 46 and thereby change the location of the spindle 30. In each parallelogram supporting a spindle, the link 46 is provided with an extension 48 and each of these is pivotally connected to a universal bar or frame 49 (see also Fig. 4) which is mounted on the horizontal supports 12 for controlled movements to the front and back and to either side. For this purpose, the universal bar 49 is slidably movable on bearings 50 on trucks 51, and the latter are mounted on bearings 52 movable on guideways 53 carried by the supports 12. The bearings and suitable guide shoulders 54 on the trucks 51 permit the movements of the universal bar to the right or to the left while the movements of the trucks 51 on the guides 53 permit the universal bar to be moved toward the front or toward the back of the machine.

It will thus be seen that by moving the universal bar, as by a suitable handle 55 located at the front of the machine within easy reach of the operator, all of the pantographic linkages are moved at the same time. In bringing the spindle over the work, the operator moves the universal bar 49 either to the right or to the left, or to the front or to the back or any combination of these directions as desired.

In so locating the spindles over the work, he may, if he wishes, directly observe the position of one of the tools 32 as it moves over the workpiece 14. However, to increase the convenient use of the machine, a guide member 56 carried by an arm 57 may be used over the dummy or sample workpiece 14a or template carried by the arm 29. This arm 57 carrying the guide 56 is, as more clearly shown in Fig. 2, connected to two of the spindles 30 which for this purpose are made longer than the others; and, being connected to two spindles, both spindles moving the same, the guide 56 is moved the same as the spindles.

After the operator has positioned the spindles over the desired place on the work, the treadle 27 is operated to raise the work and bring it into contact with the revolving tool 32 at the end of the spindle. When one hole has been deburred, the operator permits the work to descend, moves the handle 55 to position the tools over another hole to be deburred on that piece, and again operates the treadle to bring the work against the tool. The stroke of the carriage 23 is of such length that the operator may deburr holes either on the top surface 14b of the work or on the bottom flange 14c thereof.

In constructing the machine, the parts of the linkage system are preferably made with slight lost motion or looseness in certain of the bearings, particularly the bearings between the links 46 and 47, so that notwithstanding inequalities in the work or the positioning of the work on the jig, the deburring tool may automatically locate itself in the hole to be deburred. This feature is of great practical importance since, if each spindle were absolutely immovable in a horizontal plane relative to the other, it would be necessary to very accurately locate the holes in the workpieces and accurately position the latter on the jig. However, with the device provided as above explained, no more than ordinary care is required in positioning the workpieces on the jig.

Various forms of parallelograms or pantographic linkage systems may, of course, be used within the scope of this invention, but in the form at present preferred, it is preferred that the lever 40 and link 46 be so pivoted that there is a reduction of movement between the movement of the universal bar 49 and the movement of the spindle 30. In the present case, this reduction is two to one. This arrangement permits a nicety of manual control of the spindle without tedious operation of the universal bar. For instance, if the tool is to be moved in any direction an eighth of an inch to bring it over a hole to be deburred, the universal bar which is directly operated by the operator is moved over a quarter of an inch and this movement of one quarter of an inch is much more easily performed than the fraction of it.

It will be appreciated by those skilled in the art that great saving in time is effected by the present invention by operating on a plurality of pieces at one time, and that likelihood of injury to the operator is reduced to a minimum by mechanically supporting the pieces and performing the deburring operation at a point substantially remote from the operator.

Variations and modifications may be made within the scope of this invention and portions of the improvements may be used without others.

I claim:

1. In a machine for simultaneously deburring a plurality of workpieces, a support for the latter; a plurality of power-driven tool spindles, one for each workpiece; means for mounting the tool spindles and work support for corresponding relative movement between the individual tool spindles collectively and the individual workpieces collectively so that the tool spindles are located over and laterally movable over, during a work operation, different parts of the workpieces; means for collectively bringing the workpieces and tool spindles together to perform work on the workpieces; means for supporting a sample piece on the work support; and a guide member connected to the spindle mounting means for coordinate movement therewith to facilitate a manual operation of locating the spindles and workpieces in proper position to perform work at the desired place on the workpiece, and providing relative lateral movement thereof in working position.

2. In a machine for simultaneously deburring a plurality of workpieces, a support for the latter; a plurality of power-driven tool spindles, one for each workpiece; means for movably mounting the tool spindles for corresponding movements collectively relative to the individual workpieces to position the tool spindles over different parts of the workpieces, said means including a plurality of pantographic linkage systems, one for each tool spindle, and a hollow frame surrounding said linkage systems and mounted for movement in a horizontal plane; and means for collectively bringing the workpieces and tool spindles together to perform work on the workpieces.

3. In a machine for simultaneously deburring a plurality of workpieces; a support for the latter; a plurality of power-driven tool spindles, one for each workpiece; means for movably mounting the tool spindles for corresponding movements collectively relative to the individual workpieces to position the tool spindles over different parts of the workpieces, said means including a plurality of pantographic linkage systems, one for each tool spindle, means for interconnecting said linkage systems for coordinate movements, and means for manually moving said interconnecting means to position the spindles; and means for collectively bringing the workpieces and tool spindles together to perform work on the workpieces.

4. In a machine for simultaneously deburring a plurality of workpieces, a support for the latter; a plurality of power-driven tool spindles, one for each workpiece; means for movably mounting the tool spindles for corresponding movements collectively relative to the individual workpieces to position the tool spindles over different parts of the workpieces, said means including a plurality of pantographic linkage systems, one for each tool spindle and a hollow frame surrounding said linkage systems and mounted for movement in a horizontal plane; a handle on the frame for manipulating it; and foot-operated means for collectively bringing the workpieces and tool spindles together to perform work on the workpieces.

5. In a machine for simultaneously deburring a plurality of workpieces, a support for the latter; a plurality of power-driven tool spindles, one for each workpiece; means for movably mounting the tool spindles for corresponding movements collectively relative to the individual workpieces to position the tool spindles over different parts of the workpieces, said means including a plurality of pantographic linkage systems, one for each tool spindle, and means for interconnecting said linkage systems for coordinate movements, said linkage systems and said interconnecting means having lost motion to permit slight independent movement of each spindle relative to the work to compensate for inequalities in the work and their positioning on the support and permit each tool to locate itself in or over the place to be deburred; and means for collectively bringing the workpieces and tool spindles together to perform work on the workpieces.

6. In a machine for simultaneously deburring a plurality of workpieces, a central transverse rib; a work support having tables extending parallel with said rib and at each side thereof; a drive shaft mounted on said rib; a plurality of tool spindles on each side of the rib, one for each workpiece; means for movably mounting the tool spindles for lateral movement with respect to the work support to provide for corresponding relative movement between the individual tool spindles collectively and the individual workpieces collectively so that the tool spindles are located over and laterally movable over, during a work operation, different parts of the workpieces; flexible shafts connected to said drive shaft and extending from both sides of said rib to said tool spindles for driving the latter in all positions; and means for collectively bringing the workpieces and tool spindles together to perform work on the workpieces.

7. In a machine for simultaneously deburring a plurality of workpieces, a support for the latter; a transverse supporting web; a plurality of tool spindles, one for each workpiece; means for mounting each tool spindle including a forked lever embracing and pivotally mounted on said web, a forked arm embracing and fulcrumed on said forked lever, a spindle bearing carried by said forked arm, and links interconnecting said forked arm and forked lever to form a parallelogram; and a frame slidably mounted and guided to universal movement in a plane at right angles to the tool spindle and having an operating connection with the parallelogram for each spindle.

8. In a machine for simultaneously deburring a plurality of workpieces, a fixed support for the latter; a plurality of power-driven tool spindles, one for each workpiece; means for mounting the tool spindles for lateral movement collectively with respect to the workpieces collectively so that the tool spindles may be located over and movable over different parts of the workpieces; means for collectively moving the workpieces toward the tool spindles to perform work on the workpieces; a template mounted on the machine in predetermined relation to the workpieces; and a guide for cooperating with the template, said guide having a connection to the spindles for moving the same into position over the workpieces and for controlling the lateral movement of the spindles in working position as determined by the template.

9. In a machine for simultaneously deburring a plurality of workpieces, a fixed support for the latter; a plurality of power-driven tool spindles, one for each workpiece; means for mounting the tool spindles for lateral movement collectively with respect to the workpieces collectively so that the tool spindles may be located over and movable over different parts of the workpieces; means for collectively moving the workpieces toward the tool spindles to perform work on the workpieces; an enlarged template mounted on the machine in predetermined relation to the workpieces; a guide for cooperating with the template, said guide having a connection to the spindles for moving the same into position over the workpieces and for controlling the lateral movement of the spindles in working position as determined by the template; and motion-reducing means included in the connection between the guide and spindles.

10. In a machine for simultaneously deburring a plurality of workpieces, a support for the latter; a plurality of power-driven tool-carrying spindles, one for each workpiece; means for movably mounting the tool-carrying spindles for corresponding movements collectively relative to the individual workpieces to move the tool spindles over different contours of the workpieces, said means including a plurality of spindle manipulating systems, one for each spindle, each system including a fixed pivot means, a spindle holding means and a system actuating means; a manually operable means movably mounted on the machine and rigidly connected to each of the system actuating means to simultaneously move said actuating means and the spindles carried by the systems with corresponding movements over said contours during a work operation; and means for collectively bringing the workpieces and tool spindles together.

11. In a machine for simultaneously deburring a plurality of workpieces, a support for the latter; a plurality of power-driven tool-carrying spindles, one for each workpiece; means for movably mounting the tool-carrying spindles for corresponding movements collectively relative to the individual workpieces to move the tool spindles over different contours of the workpieces, said means including a plurality of spindle manipulating systems, one for each spindle, each system including a fixed pivot means, a spindle holding means and a system actuating means; a tracer movably mounted on the machine; means for connecting the tracer to each of the system actuating means to move the spindles carried by the systems with coordinated movements in direct correspondence to the movement of the tracer during a work operation; and means for collectively bringing the workpieces and tool spindles together.

ROBERT M. SCHMITZ.